United States Patent
Dravida et al.

(10) Patent No.: US 8,626,172 B2
(45) Date of Patent: Jan. 7, 2014

(54) METHOD AND APPARATUS FOR SIMULTANEOUS COMMUNICATION UTILIZING MULTIPLE WIRELESS COMMUNICATION SYSTEMS

(75) Inventors: Subrahmanyam Dravida, Shrewsbury, MA (US); Jay Rodney Walton, Carlisle, MA (US); Shravan K. Surineni, Waltham, MA (US)

(73) Assignee: QUALCOMM Incorporated, San Diego, CA (US)

( * ) Notice: Subject to any disclaimer, the term of this patent is extended or adjusted under 35 U.S.C. 154(b) by 808 days.

(21) Appl. No.: 11/502,091

(22) Filed: Aug. 9, 2006

(65) Prior Publication Data

US 2007/0037603 A1 Feb. 15, 2007

Related U.S. Application Data (60) Provisional application No. 60/707,210, filed on Aug. 10, 2005.

(51) Int. Cl.
*H04W 36/00* (2009.01)
(52) U.S. Cl.
USPC ............ 455/443; 455/432.1; 455/435.2; 455/448; 455/444; 370/328
(58) Field of Classification Search
USPC .......... 455/436, 443, 450, 127.5, 553.1, 13.2, 455/15, 127.4, 432.1, 411, 435.1, 552.1, 455/533, 438, 522, 561, 420, 455, 434, 419, 455/448, 423, 426.1, 426.3, 466; 370/331, 370/230, 328, 344
See application file for complete search history.

(56) References Cited

U.S. PATENT DOCUMENTS

| | | | | |
|---|---|---|---|---|
| 6,067,458 | A * | 5/2000 | Chen | 455/522 |
| 7,280,505 | B2 * | 10/2007 | Chaskar et al. | 370/331 |
| 7,693,522 | B2 * | 4/2010 | Bichot et al. | 455/442 |
| 2001/0008542 | A1 * | 7/2001 | Wiebke et al. | 375/141 |
| 2001/0012787 | A1 * | 8/2001 | Wortham | 455/552 |
| 2003/0134638 | A1 * | 7/2003 | Sundar et al. | 455/435 |
| 2003/0142641 | A1 * | 7/2003 | Sumner et al. | 370/328 |
| 2004/0002330 | A1 * | 1/2004 | Chitrapu | 455/426.2 |
| 2004/0023669 | A1 * | 2/2004 | Reddy | 455/456.1 |

(Continued)

FOREIGN PATENT DOCUMENTS

| | | |
|---|---|---|
| EP | 1189469 | 3/2002 |
| EP | 1 545 146 A2 | 6/2005 |

(Continued)

OTHER PUBLICATIONS

European Search Report—EP11153511—Search Authority—Munich—Mar. 30, 2011.

(Continued)

*Primary Examiner* — Quan M Hua
(74) *Attorney, Agent, or Firm* — QUALCOMM IP Department; James Hunt Yancey, Jr.

(57) ABSTRACT

A wireless communication method, apparatus, and system for simultaneous communication of a wide area network with a wireless local area network. The system having the wide area network configured to transmit control signals, the wireless local area network configured to transmit data signals, and a mobile station configured to receive control signals from the wide area network and data signals from the wireless local area network.

28 Claims, 6 Drawing Sheets

(56) References Cited

U.S. PATENT DOCUMENTS

| | | |
|---|---|---|
| 2004/0037255 A1* | 2/2004 | Joong et al. .................... 370/338 |
| 2004/0057408 A1* | 3/2004 | Gray ............................. 370/338 |
| 2004/0097260 A1* | 5/2004 | Stenton et al. .............. 455/552.1 |
| 2004/0114553 A1* | 6/2004 | Jiang et al. ..................... 370/328 |
| 2004/0176024 A1* | 9/2004 | Hsu et al. ..................... 455/3.04 |
| 2005/0070326 A1* | 3/2005 | Morton ...................... 455/552.1 |
| 2005/0153692 A1 | 7/2005 | Hwang et al. |
| 2006/0114855 A1* | 6/2006 | Zheng ........................... 370/331 |

FOREIGN PATENT DOCUMENTS

| | | |
|---|---|---|
| JP | 2003259457 A | 9/2003 |
| JP | 200456515 | 2/2004 |
| JP | 2004140563 A | 5/2004 |
| JP | 2004235976 A | 8/2004 |
| JP | 2005026977 A | 1/2005 |
| JP | 2005086471 | 3/2005 |
| JP | 2005184824 A | 7/2005 |
| JP | 2005210668 A | 8/2005 |
| JP | 2006508621 A | 3/2006 |
| JP | 2006166311 A | 6/2006 |
| JP | 2007043660 A | 2/2007 |
| JP | 2007521541 A | 8/2007 |
| KR | 20010109040 A | 12/2001 |
| RU | 2193290 C2 | 11/2002 |
| TW | I225736 B | 12/2004 |
| WO | 9931823 A1 | 6/1999 |
| WO | 03019970 A1 | 3/2003 |
| WO | 03/105493 A2 | 12/2003 |
| WO | 04/002051 A2 | 12/2003 |
| WO | 2004/017565 A | 2/2004 |
| WO | WO2004040876 A2 | 5/2004 |
| WO | WO2004062114 A2 | 7/2004 |
| WO | WO2005029901 A2 | 3/2005 |
| WO | WO2005048011 A2 | 5/2005 |

OTHER PUBLICATIONS

International Search Report—PCT/US2006/031404—International Search Authority, European Patent Office—Feb. 12, 2007.
Taiwanese Search Report—TW095129714—TIPO—Jan. 26, 2010.
Written Opinion—PCT/US2006/031404—International Search Authority, European Patent Office—Feb. 12, 2007.
Taiwan Search Report—TW099134271—TIPO—Aug. 8, 2013.

* cited by examiner

METHOD AND APPARATUS FOR SIMULTANEOUS COMMUNICATION UTILIZING MULTIPLE WIRELESS COMMUNICATION SYSTEMS

The present Application for Patent claims priority to Provisional Application No. 60/707,210 entitled "METHOD AND APPARATUS FOR SIMULTANEOUS COMMUNICATION UTILIZING MULTIPLE WIRELESS COMMUNICATION SYSTEMS" filed Aug. 10, 2005, and assigned to the assignee hereof and hereby expressly incorporated by reference herein.

BACKGROUND

1. Field

The disclosure relates to a wireless communication method and apparatus. More particularly, the disclosure relates to a method and apparatus for simultaneous communication utilizing multiple wireless communication systems.

2. Background

Wireless communication devices generally operate in either licensed radio frequency (RF) bands or unlicensed RF bands. Wide area network (WAN) providers generally acquire licenses to operate wireless communication systems in one or more of a plurality of licensed RF bands. These systems employ methods that allow multiple accesses by mobile stations on a common band of frequency channels. These systems generally operate in licensed RF bands. Other systems operate in unlicensed RF bands. Systems that operate in licensed RF bands have control over the transmissions in the licensed frequencies and channels. This allows the operator to ensure reliability of data, and in particular, control information used for control channels and link maintenance and establishment. Systems that operate in unlicensed RF band do not have this control and data transmission errors may occur as a result of uncoordinated transmissions by different users and service providers.

One access technique for WAN is frequency division multiple access (FDMA), which allows multiple access by assigning the mobile stations to different frequency channels within the RF band. Some of these systems employ frequency hopping, wherein data is transmitted to and from the intended mobile station while periodically changing the frequency channel. The periodic channel frequency hopping occurs on a regular time interval, e.g., a frame. Coordinated frequency hopping systems use predetermined hopping patterns, or hop-sets, where the hop-sets are coordinated between all mobile stations to ensure that the signals to and from two or more mobile stations do not occur simultaneously on the same frequency channel. Uncoordinated frequency hopping does not coordinate the hop-set between mobile stations resulting in the periodic occurrence of simultaneous signal transmission on the same frequency. Such simultaneous transmissions are referred to as channel collisions. Data reception errors occurring during a channel collision are referred to as data collisions. Uncoordinated frequency hopping within this type of system is generally not used as the channel collisions and resultant data collisions may occur. The FCC has prohibited coordinated frequency hopping within the Industrial Scientific and Medical (ISM) bands in order to avoid spectrum aggregation by a single type of service. Systems such as Bluetooth and 802.11 Wireless Local Area Networks (WLAN), for example, operate within the ISM bands.

Another type of WAN is a code division multiple access (CDMA) system, Global System for Communications (GSM), or a Wide Area CDMA (WCDMA) system. These systems utilize different codes for differing users to allow multiple access to prevent collision between signals of different mobile station users.

Systems, such as 802.11 WLANs, generally have very high data rates when compared to systems that operate within a licensed RF band. However, the likelihood of collisions with respect to data and control signals in 802.11 WLANs is higher when compared to WANs.

With an increasing demand for improved wireless communication devices, there remains a continuing need in the art for a method and apparatus that prevents collision between signals of different mobile stations while allowing for high data rate transfer.

SUMMARY

A wireless communication method for a mobile station may include receiving a first control signal for a first communication session via a wide area network, and receiving a data signal for the first communication session via a first wireless local area network. The mobile station may also receive voice signals for a second communication session via the wide area network or the first wireless local area network. In one embodiment, the mobile station may also receive a second control signal for the first communication session via the first wireless local area network. In another embodiment, the wireless communication method may further include receiving voice signals for a second communication session via a second wireless local area network. The wide area network performs a handoff operation of the mobile station from the first wireless local area network to the second wireless local area network.

A wireless communication method at a base station of a wide area network is disclosed. A first control signal is received, at the base station of the wide area network, for a communication session between a wireless local area network and a mobile station. The base station of the wide area network then transmits a second control signal for the communication session between the wireless local area network and the mobile station. The second control signal may be transmitted to a network management system, which subsequently transmits commands responsive to the second control signal to the wireless local area network. In one embodiment, the first or second control signal is used to adjust transmission power, code rate or bandwidth between the wireless local area network and the mobile station.

The mobile station is capable of simultaneous communication with a wide area network and a wireless local area network. The mobile station may have a first control unit configured to process control information from the wireless local area network during a communication session, a second control unit to process control information from the wide area network during the communication session, a processing device configured to generate signaling and packet processing, and a GPS device configured to provide position location information. The second control unit may be configured to receive control and voice signals from the wide area network. The first control unit may be configured to receive control, data and voice signals from the wireless local area network.

One embodiment provides a machine-readable medium embodying instructions that may be performed by one or more processors. The machine-readable medium may include instructions for processing a first control signal for a first communication session received via a wide area network and instructions for processing a data signal for the first communication session received via a first wireless local area network. The machine-readable medium may include instructions for processing voice signals for a second communication session received via the wide area network, the first wireless local area network and/or a second wireless local area network. The machine-readable medium may also include instructions for processing a second control signal for the first communication session received via the first wireless local area network.

DETAILED DESCRIPTION

Figure 1:
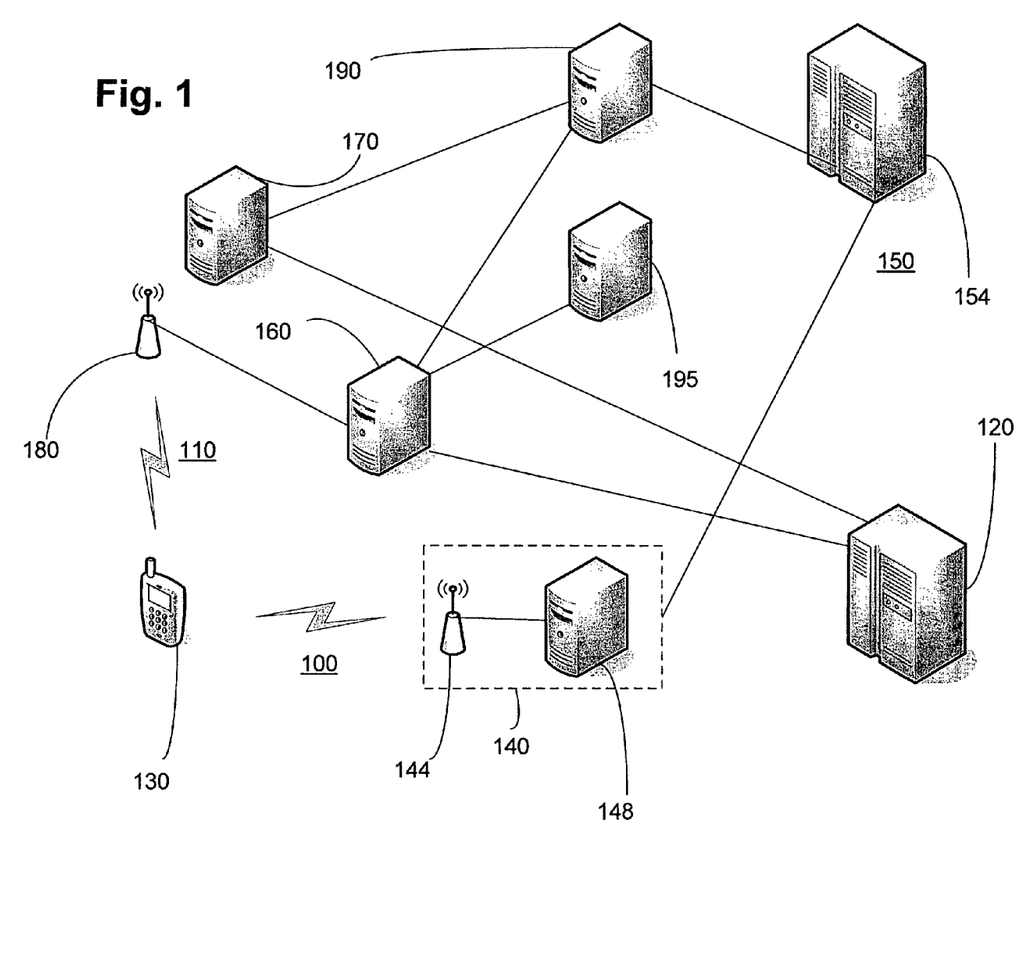
FIG. 1 illustrates a network system architecture integrating a WAN network and a WLAN according to one or more embodiments.

FIG. 1 illustrates a network system architecture having a wide area network (WAN) 100 and one or more wireless local area networks (WLANs) 110 according to one or more embodiments. Networks 100 and 110 may be managed by a network management system 120. WAN 100 may include a Base Station Subsystem (BSS) 140, and a Backhaul Subsystem (BHS) 150, although other communication between BSS 140 and a wired network may be utilized. WLAN 110 may include a Wireless Mobile Center (WMC) 160, a Mobile Transaction Server (MTS) 170 and a WLAN radio 180 coupled to WAN 100 via a gateway 190 under the control of network management system 120.

BSS 140 may be responsible for handling traffic and signaling between a Mobile Station (MS) 130 and WAN 100. BSS 140 may include a Base Transceiver Station (BTS) 144 and a Base Station Controller (BSC) 148. BTS 144 may have one or more radio transceivers operable in different radio frequencies. BTS 144 may also include equipment for selectively encrypting and decrypting communication. In addition, BSC 148 may include control, data communication facilities, and multiplexing/de-multiplexing equipments arranged to coordinate the overall operation of the base station equipments, including controlling the wireless communication links. BSC 148 may have a plurality of BTSs 144 under its control.

BHS 150 may be a transport system that may include a Mobile Switching Center (MSC) 154 with a switching center, power supplies, alarm monitoring equipment and network databases. The network databases may include a Home Location Register Authentication Center (HLR/AC) for a CDMA2000 wireless communication system, a Home Location Register (HLR) used in GSM wireless communication systems to check authorization for services including supports for roaming services and process call features, or any other databases and systems for authentication, authorization, and accounting depending on the communication system. The HLR/AC or HLR may also be used to authenticate or authorize users attempting to access WLAN 110 by receiving and processing Mobile Application Part (MAP) transactions and messages.

WLAN radio 180 may be an access point that allows the transfer of data, voice, which may include packetized voice or voice over internet protocol, and some control signals from a Mobile Station (MS) 130 to WLAN 110. WMC 160 may store information on a plurality of WLAN radios 180 and a plurality of MS 130. The information stored may include GPS location information. ILR 195 may be a repository of the mapping address for MS 130 and the corresponding mapping address for WLAN access point 180. MTS 170 may serve as the interface for mobile networks 100 and 110. Gateway 190 may be a router that couples network management system 120 with MSC 154 via MTS 170.

MS 130, in a form of dual-mode or multi-mode, may be utilized to operate in two or more different wireless communication protocols, for example, CDMA protocol and other local area technologies, such as WLAN 110. MS 130 may serve as the user's interface with WAN 100 and WLAN 110 and may include subscriber identity information, for example, subscription identity (M-ID) for CDMA 2000, which contains an authentication algorithm for confirming the identity of the user and information to allow the user to roam in different coverage areas of different technologies, including WAN 100 and WLAN 110.

MS 130 may also include one or more algorithms for performing simultaneous communication between WAN 100 and WLAN 110. In one embodiment, this simultaneous communication may transmit control signals via WAN 100 and data via WLAN 110. In another embodiment, the simultaneous communication may transmit control signals and voice signals, including digital, analog, and voice over internet protocol, via WAN 100 and data via WLAN 110. In a further embodiment, the simultaneous communication may transmit some control signals, for example, call set up and emergency signals, via WAN 100 and data, voice, and some control signals, via WLAN 110. In yet another embodiment, different combinations of signals transmitted via WAN 100 and WLAN 110 may be determined based upon available resources on WAN 100 or WLAN 110, such as loading, and on other user defined parameters, such as user accessibility and cost parameters.

To initiate a session with WLAN 110, MS 130 may access HLR/AC or HLR as it may in setting up a communication session with WAN 100. Network management system 120 may cause identity information, such as a key, a token, or other identifiers, to be transmitted to WLAN 110, via gateway 190 and MTS 170, to authorize communication for the user with WLAN 110. In another embodiment, the identity information may be transmitted via WAN 100 using an air interface to MS 130, which transmits the information to WLAN 110 over an air interface.

Once communication is established between MS 130 and WAN 100 and WLAN 110, messages can be transmitted during a communication session via the air interface between MS 130 and WAN 100 or the air interface between MS 130 and WLAN 110. In one embodiment, control messages for the session may be transmitted via WAN 100 and data may be transmitted via WLAN 110. The control signals transmitted from MS 130 via WAN 100, and feedback based upon control signals transmitted to MS 130, may be processed at BSC 148 or MSC 154, and then provided to network management system 120 or to WLAN radio 180 in order to change operating parameters. For example, the control signals transmitted to/from MS 130 can be used to increase or decrease operating parameters, such as code rates, bandwidth, power levels, etc.

Figure 2:
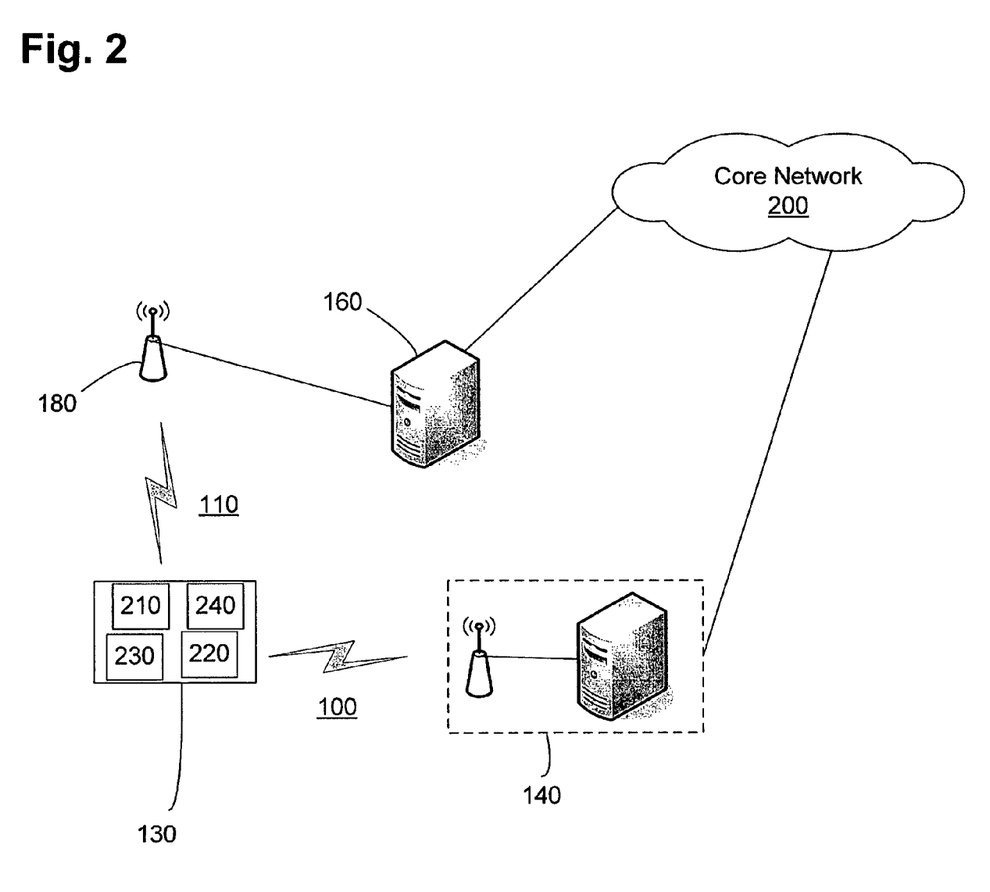
FIG. 2 illustrates a mobile station configured to communicate with multiple wireless communication systems according to one or more embodiments.

FIG. 2 illustrates MS 130 configured to communicate with a wireless communication system according to one or more embodiments. The wireless communication system may include a core network 200, a WAN 100 and a WLAN 110. Core network 200 may be any network (like IS-41 core network, GPRS IP core network, Evolved GSM core network, IP network such as the internet) that connects to WAN 100 and WLAN 110. It can carry out switching functions and manage communication access for MS 130.

In an embodiment, WAN 100 may be an integral part of core network 200. Similarly, WLAN 110 may also be an integral part of core network 200. In another embodiment, WAN 100 and WLAN 110 may be independent networks that communicate via core network 200.

MS 130 may be capable of communicating with WAN 100 or various local area networks, such as WLAN 110. MS 130 may include a WLAN communication device 210, a cellular network communication device 220 and a processing device 230. MS 130 may also have a GPS device 240 to allow for position location functionality.

WLAN communication device 210 may include a 802.11 Medium Access Control (MAC) layer, a 802.11 Physical (PHY) layer, such as 802.11a, 802.11b, 802.11g or 802.11n, and a radio. The MAC layer may manage and maintain communication between 802.11 stations by coordinating access to a shared radio channel and utilizing protocols that enhance communication over a wireless medium. The PHY layer may perform the tasks of carrier sensing, transmission and receiving of 802.11 frames, while the radio converts the modulated waveforms to radio frequency of about 2.4 or 5.0 GHz.

Cellular network communication device 220 may include a cellular modem, such as a CDMA, and a radio. The cellular modem maps bits to waveforms, while the radio converts the waveforms to PCS frequencies for communication with WAN 100. Meanwhile, processing device 230 may be a microprocessor that performs signaling as well as packet processing.

In operation, core network 200 may communicate with MS 130 through base stations of WAN 100, such as BSS 140. As part of the communication function, core network 200 may also provide communication between WLAN 110 and core network 200.

Figure 3:
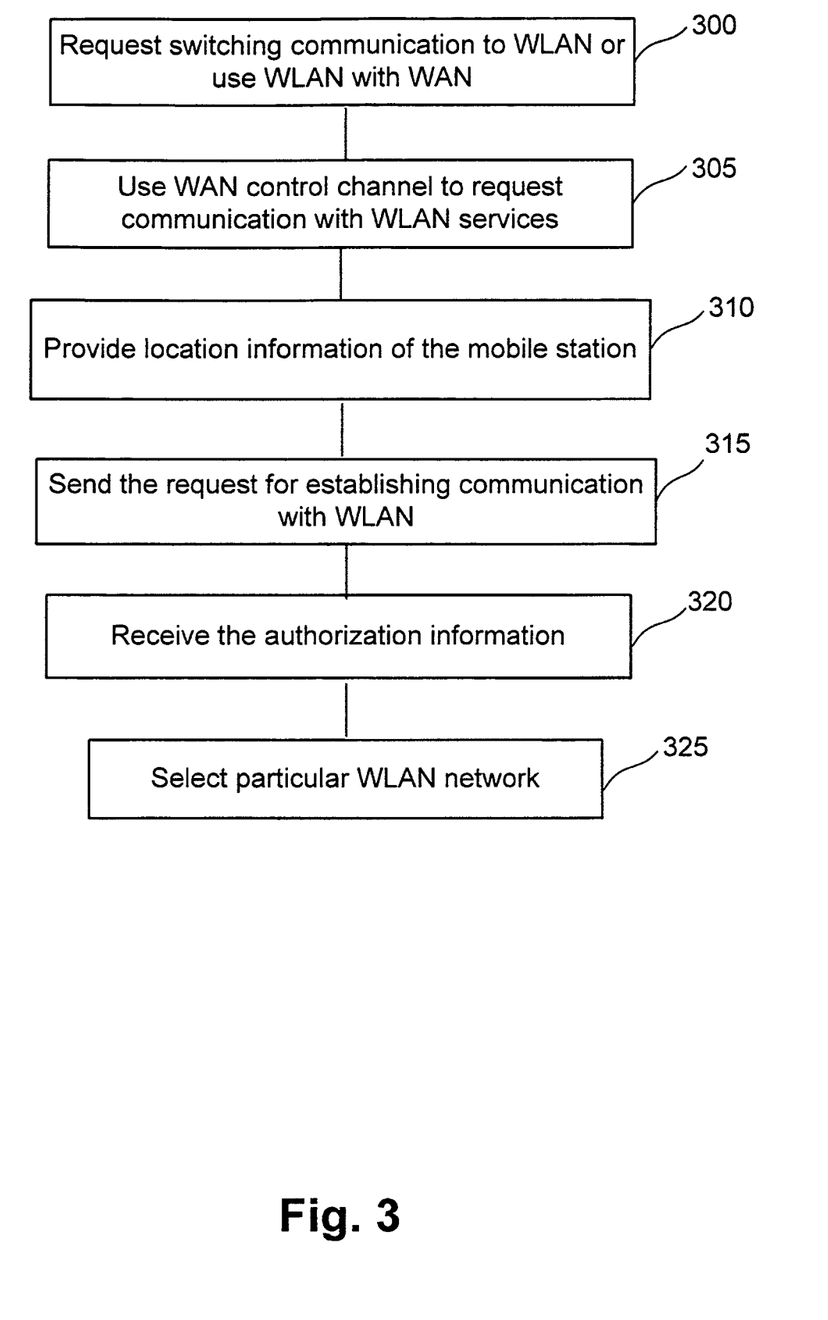
FIG. 3 is a flow chart depicting a communication method for the mobile station according to one or more embodiments.

FIG. 3 is a flow chart depicting a communication method for MS 130 according to one or more embodiments. In one embodiment, the user can select to receive communication exclusively from local access networks, such as WLAN 110, from both WLAN 110 and WAN 100. MS 130 may be configured to switch communication to WLAN 110 service or use WLAN 100 service in addition to WAN 100 service (300). MS 130 may use WAN control channel to send a request to WAN 100 to establish communication with WLAN 110 operating in its vicinity (305). GPS device 240 of the MS 130 may provide location information, such as coordinates, to the base stations of WAN 100, such as BSS 140 (310). The MS 130 may send the request for establishing communication with WLAN 110 to core network 200, in general, or to MSC 154 via BSS 140 (315).

In some aspects, MSC 154 may transmit, via gateway 190, or other network interface, the request to MTS 170, which then may send a query to network management system 120. Network management system 120 may have a database of all the locations and registered WLAN 110 for any particular location. Upon receipt of a request to establish communication with WLAN 110 from MS 130, network management system 120 may extract the required authorization information for communicating with WLAN 110, and may transmit the information back to MS 130 via MTS 170, gateway 190, MSC 154 and BSS 140. It should be noted, that other networking techniques and interface may be utilized, and that the networking technique and interface utilized is independent of the processes, functions, and other approaches described with respect to FIG. 3.

The MS 130 receives this authorization information (320). The required authorization information may include WLAN Service Set Identifier (SSID), WLAN operating channel (such as 2.4 GHz channel and channel number or 5 GHz band and channel number), features supported (such as QoS, security, etc), bandwidth utilization (percentage of available bandwidth) of all the available networks in that area. Network management system 120 may also extracts, from WMC 160, GPS location information of WLAN 110 networks in the area.

MS 130 may then use the authorization information to establish communications with WLAN 110 by selecting to join a particular WLAN 110 network in the area (325). WLAN 110 communicates with MS 130 via WLAN radio 180.

The selected WLAN 110 network may require other security related information, such as WEP keys or WPA-Pre shared keys for authentication. This information may also be requested and received by MS 130 on the WAN control channel and can be provided by WAN 100 via BSS 140, MSC 154, gateway 190, MTS 170, network management system 120 and WMC 160.

In one embodiment, WLAN 110 can be used to provide additional data, such as image, music or video content, using Digital Rights Management (DRM). DRM may handle the description, layering, analysis, valuation, trading, monitoring, authentication, and enforcement of usage restrictions that accompany the image, music or video content. DRM exchanges may take place on secure channels, such as cellular channels.

Figure 4:
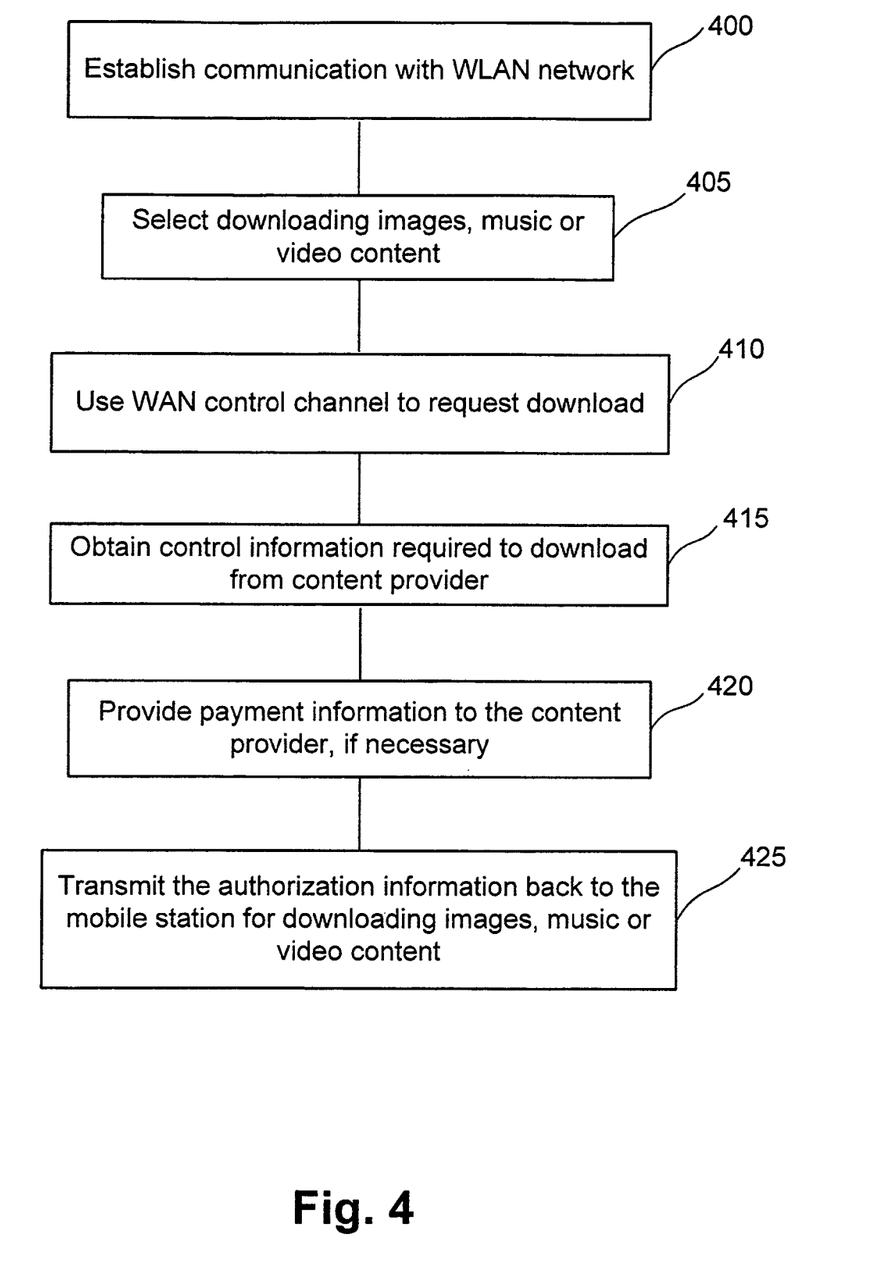
FIG. 4 is a flow chart depicting a communication method for downloading multimedia data (e.g., images, music or video content) to the mobile station according to one or more embodiments.

FIG. 4 is a flow chart depicting a communication method for downloading image, music, or video content to MS 130 according to one or more embodiments. After MS 130 establishes communication with WLAN 110 (400), the user can select to download images, music or video content (405).

In one embodiment, the downloading of images, music or video content may require DRM and access fees. The content providers may use WLAN channel for these transactions, which may then need additional input provided by the user such as credit card information and authentication information. If the content is provided in parts, then the user may provide this information every time a new part is needed to be downloaded to MS 130.

Upon selecting the images, music or video content to download, MS 130 may use WAN control channel to send the request to WAN 100 (410). The request to download may be transmitted to a content provider for obtaining control information, such as digital rights and keys, required for downloading its image, music or video content (415). If the request for downloading requires access fees, the user may securely provide payment information, such as credit card information, via the WAN control channel, to the content provider (420). The content provider may then transmit the authorization information back to MS 130 for downloading image, music or video content (425).

In another embodiment, MS 130 may use WLAN 110 services to establish and provide a voice call, while still maintaining connection with WAN 100. The WAN control channel may be used to receive WAN control messages and signaling.

Figure 5:
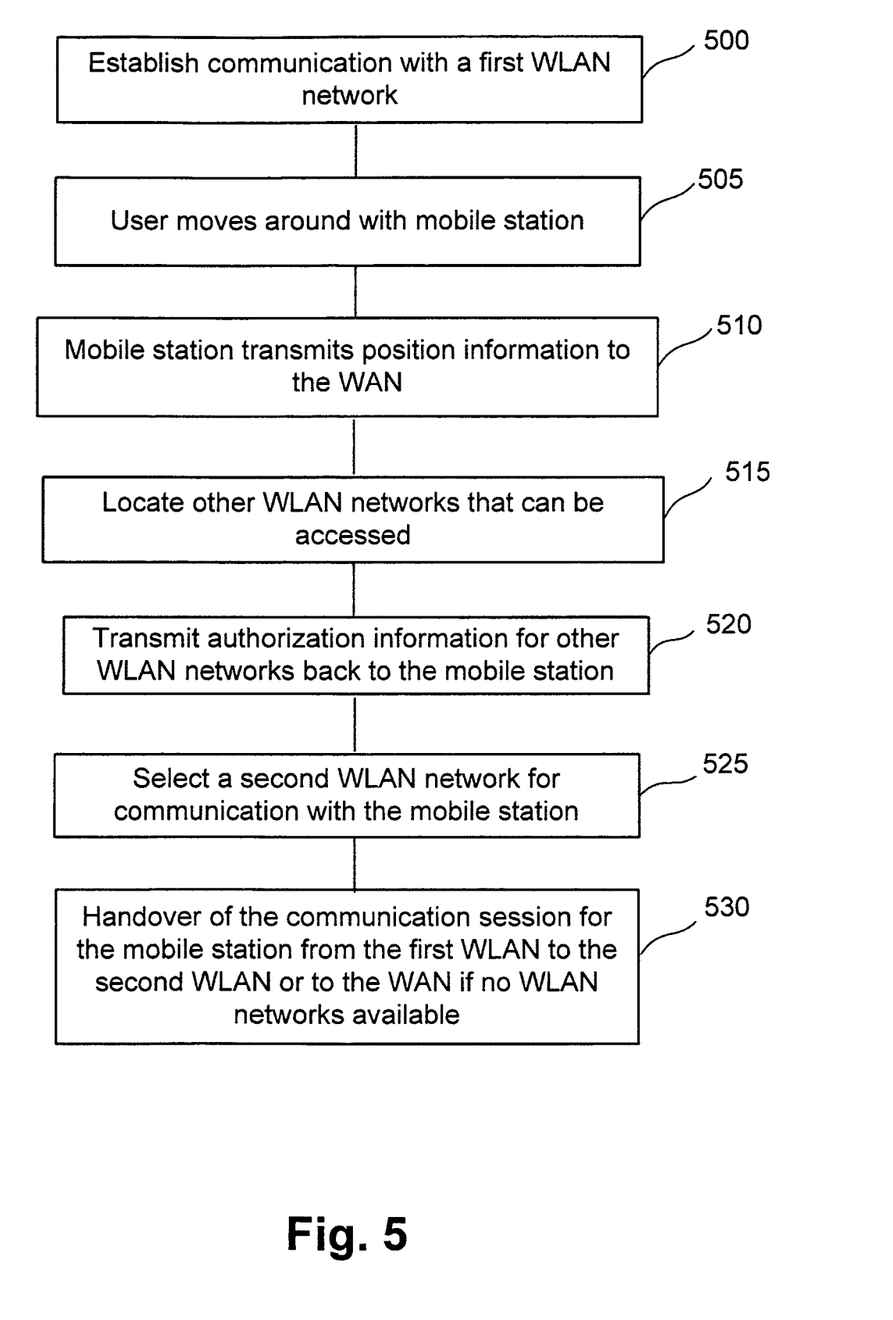
FIG. 5 is a flow chart depicting a handover communication method for the mobile station according to one or more embodiments.

FIG. 5 is a flow chart depicting a handover communication method for MS 130 according one or more embodiments. After MS 130 establishes communication with a first WLAN 110 (500), the user may move around with MS 130 and change his/her position (505). This may cause MS 130 to loose connectivity with the first WLAN 110 if the user moves out of the first WLAN 110 coverage area to a new coverage area of a second WLAN 110.

MS 130 may continuously send position information from GPS device 240 to WAN 100 (510). WAN 100 may use this information to locate other possible WLAN 110 networks that can be accessed (515). WAN 100 may transmit its query result for locating other possible WLAN 110 networks, and related authorization information back to MS 130 (520).

A second WLAN 110 may be selected based on the user's preferences, bandwidth performance, pricing, speed, service availability and available coverage (525). This may be provided by push communication to the user. For example, core network 200 may identify WLAN 110 in the vicinity of MS 130. Core network 200 may send MS 130 pricing and speed information of WLAN 110. Based on the pricing and speed information, the user of the MS 130 can determine whether utilizing the WLAN 110 is desirable. The user preference can be predetermined or can be selected upon notification of the availability of the WLAN 110 services.

If the user accepts the second WLAN 110 services, the user can receive data, voice and/or some control signals via the second WLAN 110 while other control signals are transmitted via WAN 100. WAN 100 may assist the handover of MS 130 from the first WLAN 110 to the second WLAN 110. In the event that there are no WLAN 110 networks available, the call may instead be transferred to WAN 100 (530).

In one embodiment, the user can turn on a WLAN 110 feature that allows MS 130 to receive information from WLAN 110 without otherwise requesting it. WLAN communication device 210 and cellular network communication device 220 may provide information about the availability of different WLAN 110 services at the location of MS 130. MS 130 can generate information based upon the available WLAN 110 networks with which it can communicate.

Figure 6:
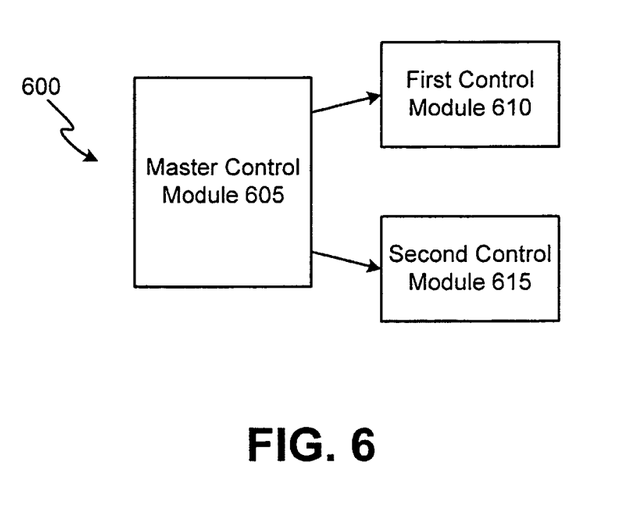
FIG. 6 is a block diagram of a decoder for a mobile station according to one or more embodiments.

FIG. 6 is a block diagram of a decoder 600 for MS 130 according to one or more embodiments. Decoder 600 may be part of processing device 230 and may be used to implement the method of FIG. 3. Decoder 600 may be coupled to the processing device 230 and/or the GPS device 240. Decoder 600 may be implemented by hardware, software, firmware, middleware, microcode, or any combination thereof. Decoder 600 may include a master control module 605 having a first control module 610 and a second control module 615. The first control module 610 may be used to receive and/or process control information from the WLAN 110 during a communication session. The second control module 615 may be used to receive and/or process control information from a WAN 100 during the communication session.

The first control module 610 may be configured to operate according to an 802.11 MAC layer and a 802.11 PHY layer. The first control module 610 may be coupled to the WLAN radio 180. The second control module 615 may be implemented in a WAN controller (not shown). Like the first control module 610, the second control module may be coupled to a radio.

Those skilled in the art will appreciate that the various illustrative logical blocks, modules, circuits, and algorithms described in connection with the embodiments disclosed herein may be implemented as electronic hardware, computer software, or combinations of both. To illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processing device, a digital signal processing device (DSP), an application specific integrated circuit (ASIC), a field programmable gate array (FPGA) or other programmable logic device, discrete gate or transistor logic, discrete hardware components, or any combination thereof designed to perform the functions described herein. A general purpose processing device may be a microprocessing device, but in the alternative, the processing device may be any conventional processing device, processing device, microprocessing device, or state machine. A processing device may also be implemented as a combination of computing devices, e.g., a combination of a DSP and a microprocessing device, a plurality of microprocessing devices, one or more microprocessing devices in conjunction with a DSP core or any other such configuration.

The methods or algorithms described in connection with the embodiments disclosed herein may be embodied directly in hardware, software, or combination thereof. In software the methods or algorithms may be embodied in one or more instructions that may be executed by a processing device. The instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processing device such the processing device can read information from, and write information to, the storage medium. In the alternative, the storage medium may be integral to the processing device. The processing device and the storage medium may reside in an ASIC. The ASIC may reside in a user terminal. In the alternative, the processing device and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A wireless communication method for a mobile station in communication with a wide area network, the method comprising:
    sending a request to the wide area network to establish a first communication session with a wireless local area network;
    receiving authorization information for one or more wireless local area networks from the wide area network in response to the request;
    selecting a first wireless local area network from among the one or more wireless local area networks;

establishing, by the mobile station, the first communication session with the selected first wireless local area network using the received authorization information from the wide area network;

receiving a data signal for the established first communication session via an access point of the first wireless local area network;

transmitting, during a wide area network communication session, from the mobile station to the wide area network via a wide area network base station a control signal that is configured to initiate an adjustment of at least one operating parameter for the established first communication session while the established first communication session with the first wireless local area network is currently ongoing with the wide area network communication session;

wherein the adjustment of at least one operating parameter is done by the selected first wireless local area network to facilitate channel configuration for transporting multimedia content via the first wireless local area network; and receiving feedback information concerning acknowledgment of the control signal via the wide area network base station.

2. The wireless communication method of claim 1, further comprising receiving voice signals for a second communication session via the wide area network.

3. The wireless communication method of claim 1, further comprising receiving voice signals for a second communication session via the first wireless local area network.

4. The wireless communication method of claim 1, further comprising receiving voice signals for a second communication session via a second wireless local area network.

5. The wireless communication method of claim 4, wherein the wide area network performs a handoff operation of the mobile station from the first wireless local area network to the second wireless local area network.

6. The method of claim 1, wherein the authorization information includes a Service Set Identifier (SSID) for each of the one or more wireless local area networks.

7. The method of claim 1, wherein the one or more wireless local area networks comprises at least two wireless local area networks.

8. The method of claim 1, further comprising receiving authentication information for the one or more wireless local area networks from the wide area network, the authentication information including a Wired Equivalent Privacy (WEP) key or a Wi-Fi Protected Access (WPA) pre-shared key, wherein establishing the first communication session with the first wireless local area network further uses the received authentication information from the wide area network.

9. The wireless communication method of claim 1, wherein the first control signal is received by the mobile station over a wide area network control channel air interface maintained by the wide area network.

10. A wireless communication method for a base station of a wide area network in communication with a mobile station, the method comprising:

receiving a request from the mobile station, at the base station of the wide area network, to establish a communication session between the mobile station and a wireless local area network;

sending to the mobile station authorization information for one or more wireless local area networks in response to the request;

receiving, at the base station via a wide area network communication session with the mobile station, a control signal configured for controlling the established communication session established between a selected wireless local area network and the mobile station while the established first communication session with the wireless local area network is currently ongoing with the wide area network communication session;

wherein the controlling a communication session comprises causing the wireless local area network to adjust at least one operating parameter of the wireless local area network to facilitate channel configuration for transporting multimedia content; and transmitting feedback information, from the base station of the wide area network, concerning acknowledgement of the control signal for the established communication session between the wireless local area network and the mobile station.

11. The wireless communication method of claim 10, further comprising sending a second control signal via a core network to the wireless local area network.

12. The wireless communication method of claim 11, wherein the sending comprises sending the second control signal to a network management system and sending commands responsive to the second control signal from the network management system to the wireless local area network.

13. The wireless communication method of claim 10, wherein the control signal is utilized to adjust a transmission power between the wireless local area network and the mobile station.

14. The wireless communication method of claim 10, wherein the control signal is utilized to adjust a transmission code rate between the wireless local area network and the mobile station.

15. The wireless communication method of claim 10, wherein the control signal is utilized to adjust a transmission bandwidth between the wireless local area network and the mobile station.

16. A mobile station capable of simultaneous communication of a wide area network with a wireless local area network, the mobile station comprising:

transceiver circuitry for sending a request to the wide area network to establish a communication session with a wireless local area network, and receiving authorization information for one or more wireless local area networks from the wide area network in response to the request;

selection logic configured to select a first wireless local area network from among the one or more wireless local area networks, the transceiver logic being further configured to establish the first communication session with the selected first wireless local area network using the received authorization information from the wide area network;

a first control unit configured to process data information for the established first communication session received from an access point of the first wireless local area network during the first communication session; and a second control unit configured to transmit, during a wide area network communication session, a control signal from the mobile station to the wide area network via a wide area network base station, the control signal is configured to initiate an adjustment of at least one operating parameter for the established first communication session while the established first communication session with the first wireless local area network is currently ongoing with the wide area network communication session, wherein the adjustment of at least one operating parameter is done by the selected first wireless local area network to facilitate channel configuration for transporting multimedia content via the first wireless local area network;
and to process feedback information concerning acknowledgment of the control signal received via the wide area network base station.

17. The mobile station of claim 16, wherein the first control unit is configured to operate according to an 802.11 MAC layer and a 802.11 PHY layer.

18. The mobile station of claim 16, further comprising a radio coupled with the first control unit.

19. The mobile station of claim 16, wherein the second control unit comprises a WAN controller.

20. The mobile station of claim 16, further comprising a radio coupled with the second control unit.

21. The mobile station of claim 16, further comprising:
a processing device configured to generate signaling and packet processing; and
a GPS device configured to provide position location information.

22. The mobile station of claim 16, wherein the first control unit receives control signals from the wireless local area network.

23. The mobile station of claim 16, wherein the operating parameter is selected from a group consisting of bandwidth, code rate, and power level, between the wireless local area network and the mobile station.

24. A non-transitory machine-readable medium embodying instructions that may be performed by one or more processors of a mobile station in communication with a wide area network, the instructions comprising:
instructions for generating a request to the wide area network to establish a first communication session with a wireless local area network;
instructions for processing authorization information for one or more wireless local area networks received via the wide area network in response to the request;
instructions for selecting a first wireless local area network from among the one or more wireless local area networks;
instructions for establishing the first communication session with the selected first wireless local area network using the received authorization information via the wide area network;
instructions for processing a data signal for the established first communication session received via an access point of the first wireless local area network;
instructions for transmitting a control signal, during a wide area network communication session, from the mobile station to the wide area network via a wide area network base station, the control signal is configured to initiate an adjustment of at least one operating parameter for the established first communication session while the established first communication session with the first wireless local area network is currently ongoing with the wide area network communication session;
wherein the adjustment of at least one operating parameter is done by the selected first wireless local area network to facilitate channel configuration for transporting multimedia content via the first wireless local area network; and
instructions for processing feedback information concerning acknowledgment of the control signal received via the wide area network base station.

25. The non-transitory machine-readable medium of claim 24, further comprising instructions for processing voice signals for a second communication session received via the wide area network.

26. The non-transitory machine-readable medium of claim 24, further comprising instructions for processing voice signals for a second communication session received via the first wireless local area network.

27. The non-transitory machine-readable medium of claim 24, further comprising instructions for processing voice signals for a second communication session received via a second wireless local area network.

28. The non-transitory machine-readable medium of claim 24, wherein the wide area network performs a handoff operation at the mobile station from the first wireless local area network to the second wireless local area network.

* * * * *